(12) United States Patent
Erickson et al.

(10) Patent No.: US 8,142,532 B2
(45) Date of Patent: Mar. 27, 2012

(54) SHAPED ABRASIVE PARTICLES WITH AN OPENING

(75) Inventors: Dwight D. Erickson, Oakdale, MN (US); Scott R. Culler, Burnsville, MN (US); Negus B. Adefris, Woodbury, MN (US); John T. Boden, White Bear Lake, MN (US); John D. Haas, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 419 days.

(21) Appl. No.: 12/337,112

(22) Filed: Dec. 17, 2008

(65) Prior Publication Data

US 2010/0151201 A1 Jun. 17, 2010

(51) Int. Cl.
*B24D 3/02* (2006.01)
*C09C 1/68* (2006.01)
*C09K 3/14* (2006.01)

(52) U.S. Cl. .......... 51/309; 428/142; 428/148; 428/329; 428/402; 51/296; 51/308

(58) Field of Classification Search .................. None
See application file for complete search history.

(56) References Cited

U.S. PATENT DOCUMENTS

| | | |
|---|---|---|
| 1,910,444 A | 5/1933 | Nicholson |
| 3,041,156 A | 6/1962 | Rowse et al. |
| 3,079,243 A | 2/1963 | Ueitz |
| 3,387,957 A | 6/1968 | Howard |
| 3,536,005 A | 10/1970 | Derrickson |
| 3,608,050 A * | 9/1971 | Carman et al. ............... 117/83 |
| 3,874,856 A | 4/1975 | Leeds |
| 3,909,991 A | 10/1975 | Coes, Jr. |
| 4,150,078 A | 4/1979 | Miller et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,548,617 A | 10/1985 | Miyatani et al. |
| 4,744,802 A | 5/1988 | Schwabel |
| 4,799,939 A | 1/1989 | Bloecher et al. |
| 4,848,041 A | 7/1989 | Kruschke |
| 4,954,462 A | 9/1990 | Wood |
| 4,963,012 A | 10/1990 | Tracy |
| 4,997,461 A | 3/1991 | Markhoff-Matheny et al. |

(Continued)

FOREIGN PATENT DOCUMENTS

CA 743 715 10/1966

(Continued)

OTHER PUBLICATIONS

Office Action dated Oct. 14, 2010 in U.S. Appl. No. 12/337,001.

(Continued)

*Primary Examiner* — Jerry Lorengo
*Assistant Examiner* — Ross J Christie
(74) *Attorney, Agent, or Firm* — Scott A. Baum

(57) ABSTRACT

Abrasive particles which are shaped abrasive particles each with an opening is disclosed. The shaped abrasive particles are formed from alpha alumina and have a first face and a second face separated by a thickness t. The opening in each of the shaped abrasive particles can improve grinding performance by reducing the size of a resulting wear flat, can provide a reservoir for grinding aid, and can improve adhesion to a backing in a coated abrasive article.

34 Claims, 5 Drawing Sheets

U.S. PATENT DOCUMENTS

| | | | |
|---|---|---|---|
| 5,009,675 A | 4/1991 | Kunz et al. |
| 5,009,676 A | 4/1991 | Rue et al. |
| 5,011,508 A | 4/1991 | Wald et al. |
| 5,035,723 A | 7/1991 | Kalinowski |
| 5,042,991 A | 8/1991 | Kunz et al. |
| 5,049,645 A | 9/1991 | Nagaoka et al. |
| 5,078,753 A | 1/1992 | Broberg et al. |
| 5,085,671 A | 2/1992 | Martin et al. |
| 5,090,968 A | 2/1992 | Pellow |
| 5,120,327 A | 6/1992 | Dennis |
| 5,152,917 A | 10/1992 | Pieper et al. |
| 5,185,299 A | 2/1993 | Wood et al. |
| 5,201,916 A * | 4/1993 | Berg et al. ............ 51/293 |
| 5,213,591 A | 5/1993 | Celikkaya et al. |
| 5,282,875 A | 2/1994 | Wood |
| 5,304,331 A | 4/1994 | Leonard et al. |
| 5,312,789 A | 5/1994 | Wood |
| 5,312,791 A | 5/1994 | Coblenz et al. |
| 5,366,523 A | 11/1994 | Rowenhorst et al. |
| 5,409,645 A | 4/1995 | Torre, Jr. et al. |
| 5,431,967 A | 7/1995 | Manthiram |
| 5,435,816 A | 7/1995 | Spurgeon et al. |
| 5,441,549 A | 8/1995 | Helmin |
| 5,443,603 A | 8/1995 | Kirkendall |
| 5,454,844 A | 10/1995 | Hibbard et al. |
| 5,496,386 A | 3/1996 | Broberg et al. |
| 5,516,348 A | 5/1996 | Conwell et al. |
| 5,551,963 A | 9/1996 | Larmie |
| 5,576,409 A | 11/1996 | Mackey |
| RE35,570 E | 7/1997 | Rowenhorst et al. |
| 5,645,619 A | 7/1997 | Erickson |
| 5,667,542 A | 9/1997 | Law et al. |
| 5,672,097 A | 9/1997 | Hoopman |
| 5,725,162 A | 3/1998 | Garg |
| 5,776,214 A | 7/1998 | Wood |
| 5,779,743 A | 7/1998 | Wood |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,946,991 A | 9/1999 | Hoopman |
| 5,975,987 A | 11/1999 | Hoopman et al. |
| 5,984,988 A | 11/1999 | Berg et al. |
| 6,019,805 A | 2/2000 | Herron |
| 6,053,956 A | 4/2000 | Wood |
| 6,054,093 A | 4/2000 | Torre, Jr. et al. |
| 6,080,215 A | 6/2000 | Stubbs |
| 6,080,216 A | 6/2000 | Erickson |
| 6,129,540 A | 10/2000 | Hoopman et al. |
| 6,206,942 B1 | 3/2001 | Wood |
| 6,228,134 B1 | 5/2001 | Erickson |
| 6,261,682 B1 | 7/2001 | Law |
| 6,264,710 B1 | 7/2001 | Erickson |
| 6,277,160 B1 | 8/2001 | Stubbs |
| 6,277,161 B1 | 8/2001 | Castro |
| 6,287,353 B1 | 9/2001 | Celikkaya |
| 6,312,324 B1 | 11/2001 | Mitsui et al. |
| 6,319,108 B1 | 11/2001 | Adefris |
| 6,475,253 B2 | 11/2002 | Culler et al. |
| 6,524,681 B1 | 2/2003 | Seitz et al. |
| 6,696,258 B1 | 2/2004 | Wei |
| 6,843,815 B1 | 1/2005 | Thurber et al. |
| 6,881,483 B2 | 4/2005 | McArdle |
| 6,974,930 B2 | 12/2005 | Jense |
| 7,297,402 B2 | 11/2007 | Evans |
| 7,373,887 B2 | 5/2008 | Jackson |
| 2001/0027623 A1 | 10/2001 | Rosenflanz |
| 2002/0026752 A1 | 3/2002 | Culler et al. |
| 2002/0151265 A1 | 10/2002 | Adefris |
| 2003/0085204 A1 | 5/2003 | Lagos |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148967 A1 | 8/2004 | Celikkaya et al. |
| 2004/0235406 A1 | 11/2004 | Duescher |
| 2004/0244675 A1 * | 12/2004 | Kishimoto et al. ............ 117/84 |
| 2005/0020190 A1 | 1/2005 | Schutz et al. |
| 2005/0060941 A1 | 3/2005 | Provow |
| 2005/0060947 A1 | 3/2005 | McArdle |
| 2005/0064805 A1 | 3/2005 | Culler et al. |
| 2005/0132655 A1 | 6/2005 | Anderson et al. |
| 2005/0232853 A1 | 10/2005 | Evans |
| 2005/0284029 A1 | 12/2005 | Bourlier |
| 2006/0185256 A1 | 8/2006 | Nevoret et al. |
| 2007/0020457 A1 | 1/2007 | Adefris |
| 2007/0072527 A1 | 3/2007 | Palmgren |
| 2008/0172951 A1 | 7/2008 | Starling |
| 2008/0262577 A1 * | 10/2008 | Altshuler et al. ............ 607/89 |
| 2009/0016916 A1 | 1/2009 | Rosenzweig et al. |
| 2010/0003904 A1 | 1/2010 | Duescher |

FOREIGN PATENT DOCUMENTS

| | | |
|---|---|---|
| EP | 0 293 163 | 11/1988 |
| EP | 0 662 110 | 7/1995 |
| EP | 1371451 A1 * | 12/2003 |
| GB | 986 847 | 3/1965 |
| JP | 60-006356 | 1/1985 |
| JP | 2002-038131 | 2/2002 |
| JP | 2003049158 A * | 2/2003 |
| JP | 2004-510873 | 4/2004 |
| JP | 2006-192540 | 7/2006 |
| WO | WO95/18192 | 7/1995 |
| WO | WO99/38817 | 8/1999 |
| WO | WO01/14494 | 3/2001 |

OTHER PUBLICATIONS

U.S. Appl. No. 12/570,067 entitled "Shaped Abrasive Particles With Low Roundness Factor" filed on Sep. 30, 2009.

U.S. Appl. No. 61/016,965 entitled "Shaped, Fractured Abrasive Particle, Abrasive Article Using Same and Method of Making", filed on Dec. 27, 2007, now expired.

U.S. Appl. No. 12/336,877 "Shaped, Fractured Abrasive Particle, Abrasive Article Using Same and Method of Making", filed on Dec. 17, 2008.

U.S. Appl. No. 12/337,001 entitled "Method of Making Abrasive Shards, Shaped Abrasive Particles With An Opening, or Dish-Shaped Abrasive Particles", filed on Dec. 17, 2008.

U.S. Appl. No. 12/336,961 entitled "Dish-Shaped Abrasive Particles With a Recessed Surface", filed on Dec. 17, 2008.

U.S. Appl. No. 61/138,268 entitled "Shaped Abrasive Particles With Grooves", filed on Dec. 17, 2008.

U.S. Appl. No. 12/337,075 entitled "Shaped Abrasive Particles With a Sloping Sidewall" filed on Dec. 17, 2008.

Office Action dated Feb. 18, 2011 in U.S. Appl. No. 12/336,877.
Office Action dated Mar. 21, 2011 in U.S. Appl. No. 12/337,001.
Office Action dated Mar. 21, 2011 in U.S. Appl. No. 12/627,567.
Office Action dated Mar. 24, 2011 in U.S. Appl. No. 12/336,961.
Office Action dated Apr. 1, 2011 in U.S. Appl. No. 12/337,075.

U.S. Appl. No. 12/827,274 entitled "Transfer Assisted Screen Printing Method of Making Shaped Abrasive Particles and the Resulting Shaped Abrasive Particles", filed on Jun. 30, 2010.

www.abrasivematerials.saint-gobain.com News—Shaped Abrasive Particles Article, Dated Apr. 25, 2011 and retrieved on May 23, 2011.

"Investigation of Shaped Abrasive Particles vol. 1: Review of US Pat. No. 6,054,093 Apr. 25, 2000" © Apr. 2011.

* cited by examiner

SHAPED ABRASIVE PARTICLES WITH AN OPENING

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

Triangular shaped abrasive particles and abrasive articles using the triangular shaped abrasive particles are disclosed in U.S. Pat. Nos. 5,201,916 to Berg; 5,366,523 to Rowenhorst; and 5,984,988 to Berg. In one embodiment, the abrasive particles' shape comprised an equilateral triangle. Triangular shaped abrasive particles are useful in manufacturing abrasive articles having enhanced cut rates.

SUMMARY

Shaped abrasive particles, in general, can have superior performance over randomly crushed abrasive particles. By controlling the shape of the abrasive particle it is possible to control the resulting performance of the abrasive article. The inventors have discovered that by making the shaped abrasive particle with an opening, hole or aperture several unexpected benefits occur.

First, the shaped abrasive particles with an opening have an enhanced cut rate as compared to similarly shaped abrasive particles without an opening. Without wishing to be bound by theory, it is believed that the enhanced cut rate results from a reduction in the size of the wear flat as the shaped abrasive particle is used. As shaped abrasive particles wear, typically a larger and larger wear flat appears on the working surface of the shaped abrasive particle dulling the shaped abrasive particle. In contrast, as the shaped abrasive particles with an opening wear, the size of the wear flat initially increases until the shaped abrasive particle is worn through to the opening. At that point, the presence of the opening effectively reduces the total size of the wear flat by creating two smaller wear flats instead of the single larger wear flat previously present. The newly formed smaller wear flats re-sharpen the shaped abrasive particle enhancing its performance over similarly shaped abrasive particles without an opening.

Second, it is believed that the opening in the shaped abrasive particle, in some embodiments, can act as a reservoir to hold more grinding aid or supersize compounds than can be placed onto similarly shaped abrasive particles without an opening. Furthermore, since the grinding aid is present on the surface and in the middle of the shaped abrasive particle with an opening, grinding aid is present both during initial use of the shaped abrasive particle and later as the shaped abrasive particle with an opening is worn through to the grinding aid reservoir located in the opening thereby enhancing cut performance.

Lastly, in some embodiments, it is believed that the opening in the shaped abrasive particles can act as an anchor point to more firmly attach the shaped abrasive particles to a backing by use of a make coat or size coat thereby reducing "shelling" of the shaped abrasive particles during use. When the shaped abrasive particles with an opening are used to form a coated abrasive article, the cured make or size coat can pass completely through the shaped abrasive particle. As such, the shaped abrasive particles with an opening are more firmly attached to the coating when compared to a similarly shaped abrasive particle which is only attached by adhesion to the sides of the particle. In essence, the shaped abrasive particles with an opening are "stitched" into the make or size coat since the coating can pass though the opening thereby more firmly holding particle as opposed to similarly shaped abrasive particles without openings being adhered only by their sides.

Hence, in one embodiment, the disclosure resides an abrasive comprising: shaped abrasive particles each with an opening, each of the shaped abrasive particles comprising alpha alumina and having a first face and a second face separated by a sidewall having a thickness t.

BRIEF DESCRIPTION OF THE DRAWING

It is to be understood by one of ordinary skill in the art that the present discussion is a description of exemplary embodiments only, and is not intended as limiting the broader aspects of the present disclosure, which broader aspects are embodied in the exemplary construction.

Figure 1A:
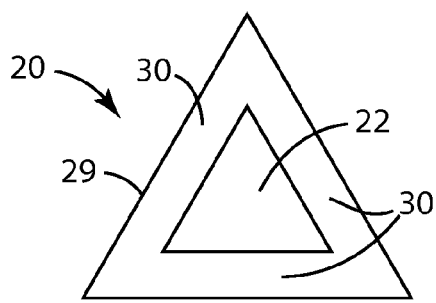
FIG. 1A illustrates a top view of one embodiment of a shaped abrasive particle with an opening.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein, the term "abrasive dispersion" means an alpha alumina precursor that can be converted into alpha alumina that is introduced into a mold cavity. The composition is referred to as an abrasive dispersion until sufficient volatile components are removed to bring solidification of the abrasive dispersion.

As used herein, the term "precursor shaped abrasive particle" means the unsintered particle produced by removing a sufficient amount of the volatile component from the abrasive dispersion, when it is in the mold cavity, to form a solidified body that can be removed from the mold cavity and substantially retain its molded shape in subsequent processing operations.

As used herein, the term "shaped abrasive particle", means a ceramic abrasive particle with at least a portion of the abrasive particle having a predetermined shape that is replicated from a mold cavity used to form the shaped precursor abrasive particle. Except in the case of abrasive shards (e.g. as described in U.S. provisional application 61/016,965), the shaped abrasive particle will generally have a predetermined geometric shape that substantially replicates the mold cavity that was used to form the shaped abrasive particle. Shaped abrasive particle as used herein excludes abrasive particles obtained by a mechanical crushing operation.

DETAILED DESCRIPTION

Shaped Abrasive Particle with an Opening

Figure 1B:
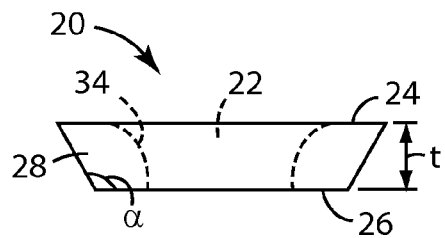
FIG. 1B illustrates a side view of one embodiment the shaped abrasive particle of FIG. 1A.
Figure 1C:
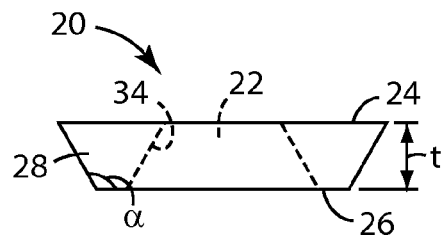
FIG. 1C illustrates a side view of another embodiment the shaped abrasive particle of FIG. 1A.

Referring to FIGS. 1A, 1B, and 1C an exemplary shaped abrasive particle 20 with an opening 22 is illustrated. The material from which the shaped abrasive particle 20 with an opening 22 is made comprises alpha alumina. Alpha alumina shaped abrasive particles can be made from a dispersion of aluminum oxide monohydrate that is gelled, molded to shape, dried to retain the shape, calcined, and sintered as discussed herein later. The shaped abrasive particle's shape is retained without the need for a binder to form an agglomerate comprising abrasive particles in a binder that are then formed into a shaped structure.

In general, the shaped abrasive particles 20 with an opening 22 comprise thin bodies having a first face 24, and a second face 26 and having a thickness t. In some embodiments, the first face 24 and the second face 26 are connected to each other by a thicker sidewall 28. In other embodiments, the sidewall 28 can minimized for particles where the faces taper to a thin edge or point where they meet instead of having a thicker sidewall 28. In some embodiments, the first face 24 is substantially planar, the second face 26 is substantially planar, or both faces are substantially planar. Alternatively, the faces could be concave or convex. In one embodiment, the first face 24 and the second face 26 are substantially parallel to each other. In other embodiments, the first face 24 and second face 26 can be nonparallel such that one face is sloped with respect to the other face and imaginary lines tangent to each face would intersect at a point. The sidewall 28 of the shaped abrasive particle 20 with an opening 22 can vary and it forms the perimeter 29 of the first face 24 and the second face 26. In one embodiment, the perimeter 29 of the first face 24 and second face 26 is selected to be a geometric shape, and the first face 24 and the second face 26 are selected to have the same geometric shape, although, they may differ in size with one face being larger than the other face. In one embodiment, the perimeter 29 of the first face 24 and the perimeter 29 of the second face 26 was a triangular shape that is illustrated.

The opening 22, in one embodiment, passes completely thorough the first face 24 and the second face 26 as best seen in FIGS. 1B and 1C. In other embodiments, the opening 22 comprises a blind hole which may not pass completely through both faces. As will be discussed later a blind hole or opening can still reduce the size of a resulting wear flat, help attach the shaped abrasive particle to a substrate or significantly reduce the bulk density of the shaped abrasive particles. In one embodiment, the size of the opening 22 is quite large relative to the area of the first face 24 or the second face 26. As best seen in FIG. 1 A, the opening 22 comprised a triangular shape closely approximating the shape of the perimeter 29 of the shaped abrasive particle 20. As such, the shaped abrasive particle 20 with an opening 22 comprised an integral connection of a plurality of bars 30 joined at their respective ends to form a closed polygon.

In various embodiments of the invention, an opening ratio of the opening area divided by the face area of the larger of either the first face 24 or the second face 26 can be between about 0.05 to about 0.95, or between about 0.1 to about 0.9, or between about 0.1 to about 0.7, between about 0.05 to about 0.5, or between about 0.05 to about 0.3. For the purposes of this calculation, the face area is based on the area enclosed by the perimeter 29 without subtracting any area due to the opening 22. As will be described later, it is believed that shaped abrasive particles 20 having a larger opening 22 relative to the face size have enhanced grinding performance. The shaped abrasive particles 20 with an opening 22 in FIG. 3 had an average opening ratio of 0.23 and the shaped abrasive particles 20 with an opening 22 in FIG. 4 had an opening ratio of 0.05.

In various embodiments of the invention, the area or size of the first face 24 and the area or size of the second face 26 are substantially equal. In other embodiments of the invention, the first face 24 or second face 26 can be smaller than the other face. Referring to FIGS. 1B and 1C, draft angle α between the second face 26 and the sidewall 28 of the shaped abrasive particle 20 can be varied to change the relative sizes of each face. In one embodiment of the invention, draft angle α can be approximately 90 degrees such that the area of both faces are substantially equal. In another embodiment of the invention, draft angle α can be greater than 90 degrees such that the area of the first face 24 is greater than the area of the second face 26. In another embodiment of the invention, draft angle α can be less than 90 degrees such that the area of the first face 24 is less than the area of the second face 26. In various embodiments of the invention, the draft angle α can be between approximately 95 degrees to approximately 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees.

Without wishing to be bound by theory, it is believed that a draft angle other than 90 degrees results in the shaped abrasive particles 20 leaning instead of having a 90 degree orientation to the backing 52 in a coated abrasive article 50 since the base of the shaped abrasive particle 20 in the coated abrasive (sidewall 28) is sloped due to the draft angle. Because the shaped abrasive particles 20 are mostly tipped or leaning to one side due to the angled base they rest on, they can have an orientation angle less than 90 degrees relative to the backing 52 thereby enhancing cut rates as described in greater detail in copending patent application U.S. Ser. No. 12/337,075 entitled "Shaped Abrasive Particles With A Sloping Sidewall", filed on Dec. 17, 2008.

Figure 2A:
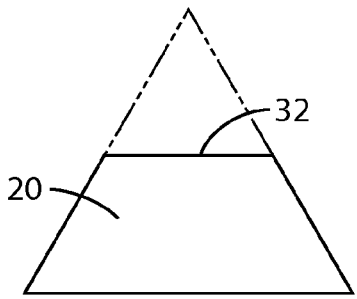
FIG. 2A illustrates a side view of a partially worn shaped abrasive particle without an opening.
Figure 2B:
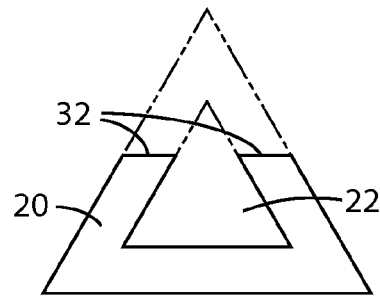
FIG. 2B illustrates a side view of a partially worn shaped abrasive particle of FIG. 1A when attached to an abrasive article by the triangle's base.
Figure 2C:
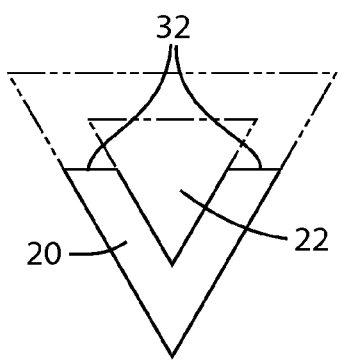
FIG. 2C illustrates a side view of a partially worn shaped abrasive particle of FIG. 1A when attached to an abrasive article by the triangle's tip.

Referring now to FIGS. 2A-2C, three shaped abrasive particles are illustrated worn through about ⅓ of the particle's original height as shown by dashed lines. FIG. 2A shows a similarly shaped, solid, shaped abrasive particle as commonly orientated to make a coated abrasive article 50. As the tip of the particle wears away, a wear flat 32 appears that begins to dull the particle. Due to the shape of the particle, the size of the wear flat typically becomes larger and larger as more of the shaped abrasive particle is used up. Thus, the cutting performance for the shaped abrasive particle can drop significantly as the size of the wear flat continues to increase.

FIG. 2B shows a shaped abrasive particle 20 with an opening 22 worn when orientated with its tip or vertex up in a coated abrasive article 50. As the tip of the shaped abrasive particle 20 wears away, the size of the wear flat remains relatively constant regardless of the particle's current height. This result can occur when the shape of the opening 22 leaves a relatively constant area of the shaped abrasive particle in contact with the workpiece as the height of the shaped abrasive particle is reduced. For the illustrated shaped abrasive particle, the size of the two wear flats 32, after the initial peak is used up, can remain fairly small until the two side bars are used up at which point the length of the wear flat approaches the width of the shaped abrasive particle. Without wishing to be bound by theory, it is believed that shaped abrasive particles 20 having larger openings 22 and smaller wear flats 32 will cut better than shaped abrasive particles 20 with smaller openings 22 or no openings and larger wear flats 32.

FIG. 2C shows a shaped abrasive particle 20 with an opening 22 worn when orientated with its tip or vertex down in a coated abrasive article 50. Initially, a large wear flat 32 is present; but after that material is removed, the size of the wear flat 32 drops significantly once the shaped abrasive particle is worn down to the opening 22. Thus, even shaped abrasive particles oriented with the base up and tip down can benefit from the presence of the opening 22.

Shaped abrasive particles 20 with an opening 22 can have several unexpected benefits over solid, shaped abrasive particles without an opening. First, the shaped abrasive particles 20 with an opening 22 have an enhanced cut rate as compared to solid, shaped abrasive particles as shown in the Examples and FIGS. 7 and 8. Without wishing to be bound by theory, it is believed that the enhanced cut rate results from a reduction in the size of the wear flat 32 as the shaped abrasive particle is used. As shaped abrasive particles wear, typically a larger and larger wear flat 32 appears on the working surface of the shaped abrasive particle dulling the shaped abrasive particle. In contrast, as the shaped abrasive particles 20 with an opening 22 wear, the size of the wear flat 32 can initially increase until the particle is worn through to the opening 22. At that point, the presence of the opening 22 effectively reduces the total size of the wear flat 32 by creating two smaller wear flats instead of the single larger wear flat previously present. The newly formed smaller wear flats 32 re-sharpen the shaped abrasive particle 20 enhancing its performance over shaped, solid, shaped abrasive particles.

Second, it is believed that the opening 22 in the shaped abrasive particle 20, in some embodiments, can act as a reservoir to hold more grinding aid or supersize compounds than can be placed onto solid, shaped abrasive particles without an opening 22. Furthermore, since the grinding aid is present on the surface and in the middle of the shaped abrasive particle 20 with an opening 22, grinding aid is present both during initial use of the shaped abrasive particle and later as the shaped abrasive particle 20 with an opening 22 is worn through to the grinding aid reservoir located in the opening 22 thereby enhancing cut performance.

Lastly, in some embodiments, it is believed that the opening 22 in the shaped abrasive particles 20 can act as an anchor point to more firmly attach the shaped abrasive particles 20 to a backing 52 by use of a make coat 54 or size coat 58 thereby reducing "shelling" of the shaped abrasive particles 20 with an opening 22 during use. When the shaped abrasive particles 20 with an opening 22 are used to form a coated abrasive article 50, the cured make or size coat 58 can pass completely through the shaped abrasive particle 20. As such, the shaped abrasive particles 20 with an opening 22 are more firmly attached to the coating when compared to a solid, shaped abrasive particle which is only attached by adhesion to the sides of the shaped abrasive particle. In essence, the shaped abrasive particles 20 with an opening 22 are "stitched" into the make or size coat 58 since the coating can pass though the opening 22 thereby more firmly holding shaped abrasive particle as opposed to solid, shaped abrasive particles being adhered only by their sides.

In various embodiments of the invention in a coated abrasive article 50, the opening 22 in the shaped abrasive particles 20 with an opening 22 can contain make coating, size coating, supersize coating, grinding aid, empty space, or any combination of these items.

Figure 3:
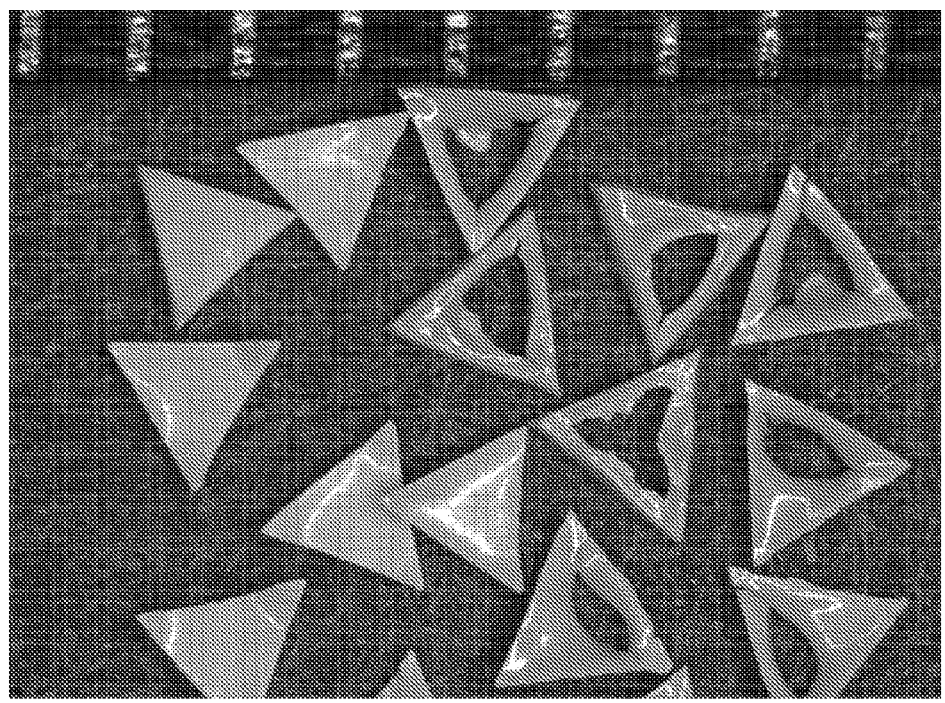
FIG. 3 illustrates a photomicrograph of shaped abrasive particles with an opening compared to similarly shaped abrasive particles without an opening.
Figure 4:
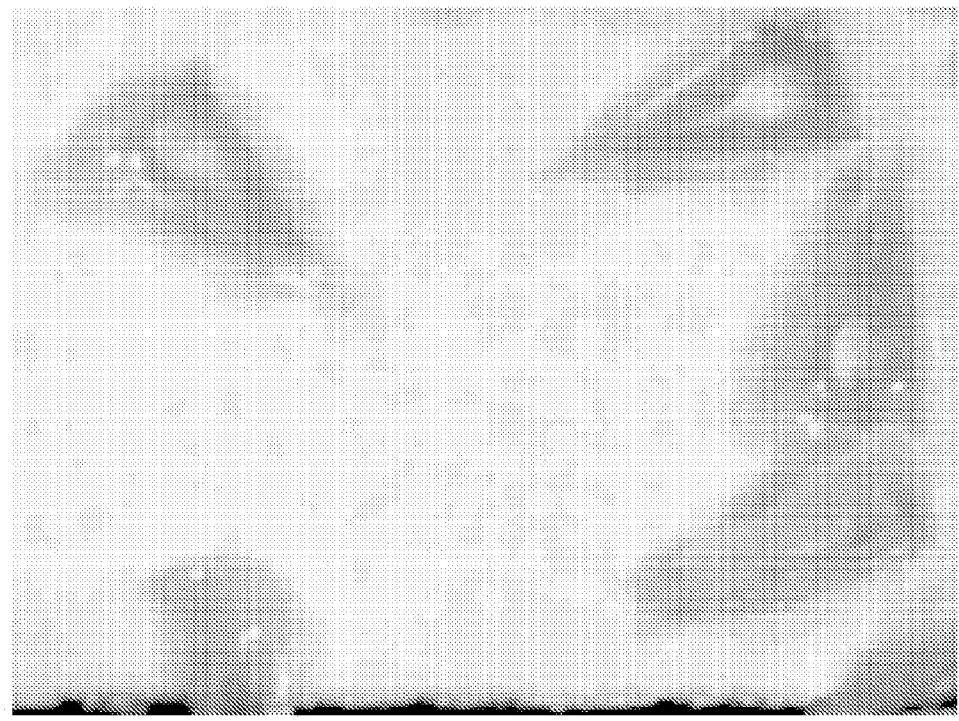
FIG. 4 illustrates a photomicrograph of another embodiment of shaped abrasive particles with an opening.

Referring now to FIGS. 3 and 4, photomicrographs of shaped abrasive particles 20 with an opening 22 are shown. FIG. 3 shows a comparison of shaped abrasive particles 20 with an opening 22 to similarly shaped, dish-shaped abrasive particles. More information concerning the grinding improvement resulting from dish-shaped abrasive particles is disclosed in U.S. patent application Ser. No. 12/336,961 entitled "Dish-Shaped Abrasive Particles With A Recessed Surface", filed on Dec. 17, 2008. In FIG. 3, the upper or lower perimeter 29 of the first face 24 and the second face 26 forms an equilateral triangle. In FIG. 4, the upper or lower perimeter 29 of the first face 24 and the second face 26 forms an isosceles triangle.

There are two primary methods for making the shaped abrasive particles 20 with an opening 22. In both methods, a plastic or polymeric production tooling having a plurality of mold cavities is used to form a plurality of precursor shaped abrasive particles. In one method, the drying rate of the sol-gel is controlled such that the sol-gel tends to migrate during drying towards the edges and sides of the mold cavity resulting in an opening 22 being formed in the shaped abrasive particle 20. In FIG. 3, all of the shaped abrasive particles 20 shown were made using the same production tooling; however, the drying conditions and drying rates were changed to make the shaped abrasive particles 20 with an opening 22 shown on the right-hand side. In the other prophetic method, it is believed that the mold cavities in the production tooling can have an upstanding mold element in the shape of the opening 22 that prevents the sol-gel from occupying the center or other portion of the mold cavity thereby forming an opening 22 in the precursor shaped abrasive particles. By using a mold cavity that resembles a "Bundt" cake pan, which leaves a hole in the center of a Bundt cake, an opening 22 in each of the shaped abrasive particles 20 can be formed.

Because of the above different methods to make the shaped abrasive particles 20 with an opening 22, the contour of the resulting opening 22 can be quite different. As best seen in FIG. 1B and FIGS. 3-4, when using the controlled drying method an inner surface 34 of the opening 22 is convex or curved such that the size of the opening in the first face 24 is larger than the size of the opening in the second face 26. It is believed that the curvature results from a meniscus forming in the sol-gel during the controlled drying. As the drying progresses, the sol-gel is wicked towards and up the edges of the polypropylene mold leaving an opening 22 in the shaped abrasive particle 20 and a curved inner surface 34. As best seen in FIG. 1C, when the opening 22 is formed by a mold having an upstanding mold element, the contour of the inner surface 34 can be controlled. The contour of the inner surface 34 may be planar, convex, or concave depending on the shape of the upstanding mold element. Additionally, the inner surface 34 can be tapered such that the size of the opening 22 in each face is different. It is believed that the inner surface 34 should be a tapered surface such that the opening 22 is narrower at the top of the mold cavity and wider at the bottom of the mold cavity for best release of the shaped abrasive particles 20 from the mold and to prevent cracking of the shaped abrasive particles 20 during drying.

Figure 5A:
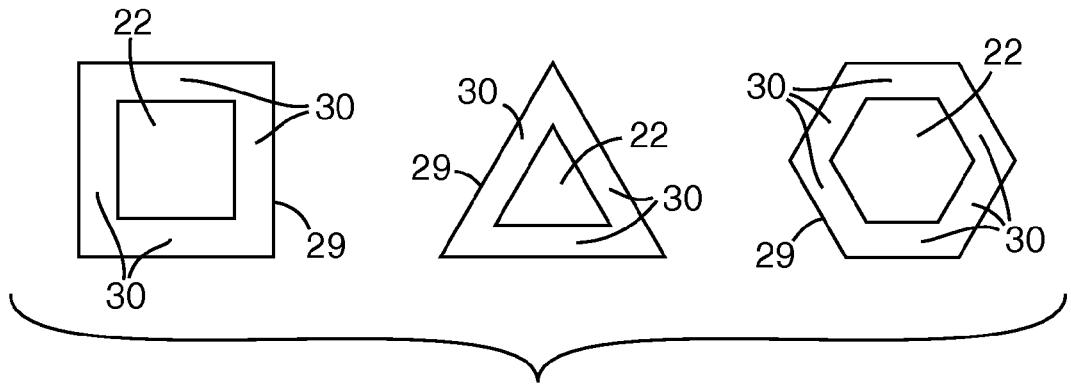
FIG. 5 illustrates alternative embodiments of shaped abrasive particles with an opening.
Figure 5B:
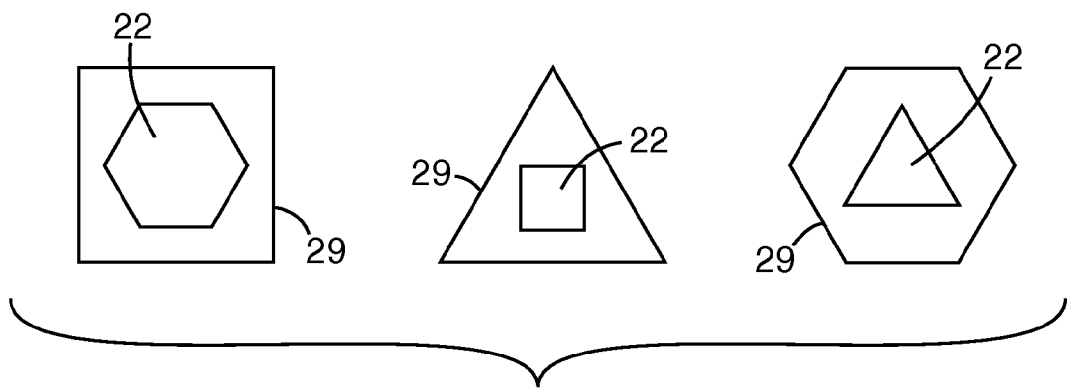
Figure 5C:
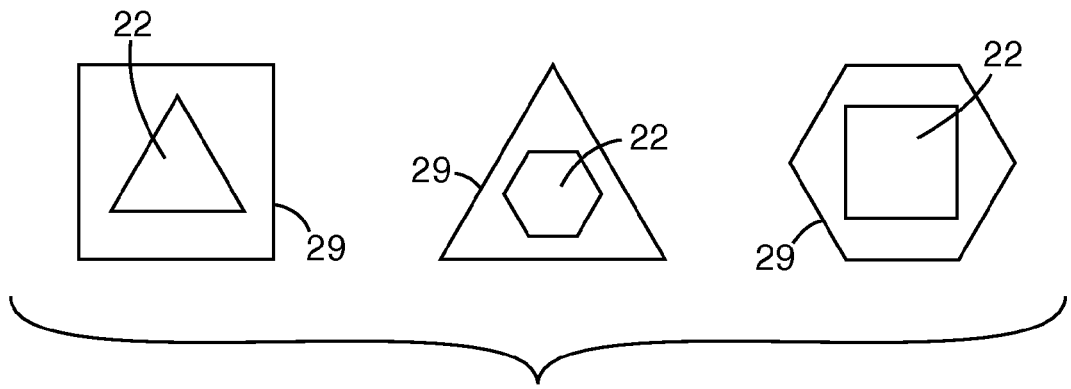

Referring to FIG. 5, the shaped abrasive particles 20 with an opening 22 can have various three-dimensional shapes. The geometric shape of the perimeter 29 can be triangular, rectangular, circular, elliptical, star-shaped or that of other regular or irregular polygons. The opening 22 can be selected to have the same shape as the perimeter 29 as shown in FIG. 5A. Thus, the shaped abrasive particles 20 with an opening 22 can comprise an integral connection of a plurality of bars 30 joined at their respective ends to form a closed polygon. Alternatively, the shape of the opening 22 can be selected to be different than the shape of the perimeter 29 as shown in FIGS. 5B and 5C. Depending of the primary function of the opening 22 (enhancing cut rate, grinding aid reservoir, or reduced shelling) the size and/or shape of the opening 22 can be varied to perform different functions more effectively. In one embodiment, the perimeter 29 comprised an equilateral triangle. For the purpose of this disclosure, a substantially triangular shape also includes three-sided polygons wherein one or more of the sides can be arcuate and/or the tips of the triangle can be arcuate.

In most cases, the ratio of the length of the shortest facial dimension of the shaped abrasive particle 20 to the thickness of the shaped abrasive particle 20 is at least 1 to 1, or at least 2 to 1, or at least 5 to 1, or at least 6 to 1. As used herein, the term "thickness", when applied to a particle having a thickness that varies over its planar configuration, shall mean the minimum thickness. If the particle is of substantially uniform thickness, the values of minimum, maximum, mean, and median thickness shall be substantially equal. For example, in the case of a triangle, if the thickness is equivalent to "a", the length of the shortest side of the triangle is preferably at least "2a". In the case of a particle in which two or more of the shortest facial dimensions are of equal length, the foregoing relationship continues to hold. In most cases, the shaped abrasive particles 20 are polygons having at least three sides, the length of each side being greater than the thickness of the particle. In the special situation of a circle, ellipse, or a polygon having very short sides, the diameter of the circle, minimum diameter of the ellipse, or the diameter of the circle that can be circumscribed about the very short-sided polygon is considered to be the shortest facial dimension of the particle. The thickness of the particles preferably ranges from about 10 to 1000 micrometers. This aspect ratio can provide improved performance of the shaped abrasive particle 20.

The shaped abrasive particles 20 with an opening 22 can have various volumetric aspect ratios. The volumetric aspect ratio is defined as the ratio of the maximum cross sectional area passing through the centroid of a volume divided by the minimum cross sectional area passing through the centroid. For some shapes, the maximum or minimum cross sectional area may be a plane tipped, angled, or tilted with respect to the external geometry of the shape. For example, a sphere would have a volumetric aspect ratio of 1.000 while a cube will have a volumetric aspect ratio of 1.414. A shaped abrasive particle in the form of an equilateral triangle having each side equal to length A and a thickness equal to A will have a volumetric aspect ratio of 1.54, and if the thickness is reduced to 0.25 A, the volumetric aspect ratio is increased to 2.64. It is believed that shaped abrasive particles with an opening having a larger volumetric aspect ratio have enhanced cutting performance. In various embodiments of the invention, the volumetric aspect ratio for the shaped abrasive particles with an opening can be greater than about 1.15, or greater than about 1.50, or greater than about 2.0, or between about 1.15 to about 10.0, or between about 1.20 to about 5.0, or between about 1.30 to about 3.0.

Another feature of the shaped abrasive particles 20 with an opening 22 can be an extremely low bulk density as tested by ANSI B74.4—1992 Procedure for Bulk Density of Abrasive Grains. Since the opening 22 can significantly reduce the mass of the shaped abrasive particles 20 without reducing their overall size, the resulting bulk density can be extremely low. Moreover, the bulk density of the shaped abrasive particles 20 can be readily changed and controlled by simply varying the size and shape of the opening 22 in the particles. For some applications, such a vitrified bonded abrasive grinding wheels, low bulk density abrasive particles can have better grinding performance.

The bulk density of the solid triangles in FIG. 3 was determined to be 1.40 g/cm$^3$. The bulk density of the triangles with the openings in FIG. 3 was determined to be 0.91 g/cm$^3$. The bulk density of the isosceles triangles with openings in FIG. 4 was determined to be 0.89 g/cm$^3$. In various embodiments of the invention, the bulk density of the shaped abrasive particles 20 with an opening 22 can be less than 1.35 g/cm$^3$, or less than 1.20 g/cm$^3$, or less than 1.00 g/cm$^3$, or less than 0.90 g/cm$^3$.

Shaped abrasive particles 20 with an opening 22 made according to the present disclosure can be incorporated into an abrasive article, or used in loose form. Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the shaped abrasive particles 20 with an opening 22 can graded to a nominal screened grade using U.S.A. Standard Test Sieves conforming to ASTM E-11 "Standard Specification for Wire Cloth and Sieves for Testing Purposes." ASTM E-11 proscribes the requirements for the design and construction of testing sieves using a medium of woven wire cloth mounted in a frame for the classification of materials according to a designated particle size. A typical designation may be represented as −18+20 meaning that the abrasive particles pass through a test sieve meeting ASTM E-11 specifications for the number 18 sieve and are retained on a test sieve meeting ASTM E-11 specifications for the number 20 sieve. In one embodiment, the shaped abrasive particles 20 with an opening 22 have a particle size such that most of the particles pass through an 18 mesh test sieve and can be retained on a 20, 25, 30, 35, 40, 45, or 50 mesh test sieve. In various embodiments of the invention, the shaped abrasive particles 20 with an opening 22 can have a nominal screened grade comprising: −18+20, −20+25, −25+30, −30+

35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635.

In one aspect, the present disclosure provides a plurality of shaped abrasive particles having an abrasives industry specified nominal grade or nominal screened grade, wherein at least a portion of the plurality of abrasive particles are shaped abrasive particles 20 with an opening 22. In another aspect, the disclosure provides a method comprising grading the shaped abrasive particles 20 with an opening 22 made according to the present disclosure to provide a plurality of shaped abrasive particles 20 with an opening 22 having an abrasives industry specified nominal grade or a nominal screened grade.

If desired, the shaped abrasive particles 20 with an opening 22 having an abrasives industry specified nominal grade or a nominal screened grade can be mixed with other known abrasive or non-abrasive particles. In some embodiments, at least 5, 10, 15, 20, 25, 30, 35, 40, 45, 50, 55, 60, 65, 70, 75, 80, 85, 90, 95, or even 100 percent by weight of the plurality of abrasive particles having an abrasives industry specified nominal grade or a nominal screened grade are shaped abrasive particles 20 with an opening 22 made according to the present disclosure, based on the total weight of the plurality of abrasive particles.

Particles suitable for mixing with the shaped abrasive particles 20 with an opening 22 include conventional abrasive grains, diluent grains, or erodable agglomerates, such as those described in U.S. Pat. Nos. 4,799,939 and 5,078,753. Representative examples of conventional abrasive grains include fused aluminum oxide, silicon carbide, garnet, fused alumina zirconia, cubic boron nitride, diamond, and the like. Representative examples of diluent grains include marble, gypsum, and glass. Blends of differently shaped abrasive particles 20 with an opening 22 (triangles and squares for example) or blends of shaped abrasive particles 20 having differently sized openings can be used in the articles of this invention.

The shaped abrasive particles 20 with an opening 22 may also have a surface coating. Surface coatings are known to improve the adhesion between abrasive grains and the binder in abrasive articles or can be used to aid in electrostatic deposition of the shaped abrasive particles 20. Such surface coatings are described in U.S. Pat. Nos. 5,213,591; 5,011,508; 1,910,444; 3,041,156; 5,009,675; 5,085,671; 4,997,461; and 5,042,991. Additionally, the surface coating may prevent the shaped abrasive particles from capping. Capping is the term to describe the phenomenon where metal particles from the workpiece being abraded become welded to the tops of the shaped abrasive particles. Surface coatings to perform the above functions are known to those of skill in the art.

Abrasive Article Having Shaped Abrasive Particles with an Opening

Figure 6:
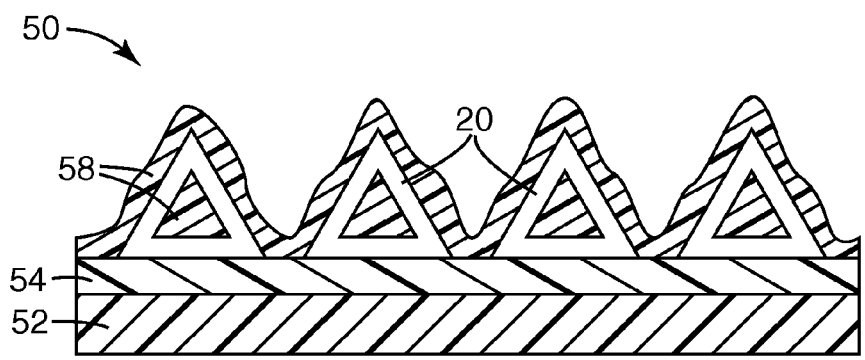
FIG. 6 illustrates an abrasive article having a plurality of shaped abrasive particles with an opening.

Referring to FIG. 6, a coated abrasive article 50 comprises a backing 52 having a first layer of binder, hereinafter referred to as the make coat 54, applied over one major surface of backing 52. Attached or partially embedded in make coat 54 are a plurality of shaped abrasive particles 20 with an opening 22 forming an abrasive layer. Over the shaped abrasive particles 20 with an opening 22 is a second layer of binder, hereinafter referred to as the size coat 58. The purpose of make coat 54 is to secure shaped abrasive particles 20 with an opening 22 to backing 52 and the purpose of size coat 58 is to reinforce shaped abrasive particles 20 with an opening 22. The shaped abrasive particles 20 with an opening 22 can be oriented such that the tip or vertex points away from the backing 52 as shown or towards the backing 52. As previously discussed, the opening 22 in the shaped abrasive particles 20 with an opening 22 can contain make coat 54, size coat 58, supersize coat, grinding aid, empty space, or any combination of these items depending on how the coated abrasive article 50 is manufactured and the primary purpose of the opening 22 for that particular abrasive article application.

The make coat 54 and size coat 58 comprise a resinous adhesive. The resinous adhesive of the make coat 54 can be the same as or different from that of the size coat 58. Examples of resinous adhesives that are suitable for these coats include phenolic resins, epoxy resins, urea-formaldehyde resins, acrylate resins, aminoplast resins, melamine resins, acrylated epoxy resins, urethane resins and combinations thereof. In addition to the resinous adhesive, the make coat 54 or size coat 58, or both coats, may further comprise additives that are known in the art, such as, for example, fillers, grinding aids, wetting agents, surfactants, dyes, pigments, coupling agents, adhesion promoters, and combinations thereof. Examples of fillers include calcium carbonate, silica, talc, clay, calcium metasilicate, dolomite, aluminum sulfate and combinations thereof.

A grinding aid is defined as particulate material, the addition of which has a significant effect on the chemical and physical processes of abrading, thereby resulting in improved performance. As mentioned, it is believed that the shaped abrasive particles 20 with an opening 22 can have increased performance as a result of the opening 22 acting as a grinding aid reservoir. It is believed that the shaped abrasive particles 20 can have the opening 22 filled with a grinding aid prior to electrostatic deposition of the shaped abrasive particles 20 with an opening 22 thereby performing this function.

Grinding aids encompass a wide variety of different materials and can be inorganic or organic. Examples of chemical groups of grinding aids include waxes, organic halide compounds, halide salts, and metals and their alloys. The organic halide compounds will typically break down during abrading and release a halogen acid or a gaseous halide compound. Examples of such materials include chlorinated waxes, such as tetrachloronaphtalene, pentachloronaphthalene; and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, magnesium chloride. Examples of metals include tin, lead, bismuth, cobalt, antimony, cadmium, iron, and titanium. Other grinding aids include sulfur, organic sulfur compounds, graphite, and metallic sulfides. It is also within the scope of this invention to use a combination of different grinding aids; in some instances, this may produce a synergistic effect. In one embodiment, the grinding aid was cryolite or potassium tetrafluoroborate. The amount of such additives can be adjusted to give desired properties. It is also within the scope of this invention to utilize a supersize coating. The supersize coating typically contains a binder and a grinding aid. The binders can be formed from such materials as phenolic resins, acrylate resins, epoxy resins, urea-formaldehyde resins, melamine resins, urethane resins, and combinations thereof.

It is also within the scope of this invention that the shaped abrasive particles 20 with an opening 22 can be utilized in a bonded abrasive article, a nonwoven abrasive article, or abrasive brushes. A bonded abrasive can comprises a plurality of the shaped abrasive particles 20 with an opening 22 bonded together by means of a binder to form a shaped mass. The binder for a bonded abrasive can be metallic, organic, or vitreous. A nonwoven abrasive comprises a plurality of shaped abrasive particles 20 with an opening 22 bonded into a fibrous nonwoven web by means of an organic binder.

Method of Making Shaped Abrasive Particles with an Opening

The first process step involves providing either a seeded on un-seeded abrasive dispersion that can be converted into alpha alumina. The alpha alumina precursor composition often comprises a liquid that is a volatile component. In one embodiment, the volatile component is water. The abrasive dispersion should comprise a sufficient amount of liquid for the viscosity of the abrasive dispersion to be sufficiently low to enable filling the mold cavities and replicating the mold surfaces, but not so much liquid as to cause subsequent removal of the liquid from the mold cavity to be prohibitively expensive. In one embodiment, the abrasive dispersion comprises from 2 percent to 90 percent by weight of the particles that can be converted into alpha alumina, such as particles of aluminum oxide monohydrate (boehmite), and at least 10 percent by weight, or from 50 percent to 70 percent, or 50 percent to 60 percent, by weight of the volatile component such as water. Conversely, the abrasive dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trademarks "DISPERAL", and "DISPAL", both available from Sasol North America, Inc. or "HiQ-40" available from BASF Corporation. These aluminum oxide monohydrates are relatively pure, i.e., they include relatively little, if any, hydrate phases other than monohydrates, and have a high surface area. The physical properties of the resulting shaped abrasive particles 20 with an opening 22 will generally depend upon the type of material used in the abrasive dispersion.

In one embodiment, the abrasive dispersion is in a gel state. As used herein, a "gel" is a three dimensional network of solids dispersed in a liquid. The abrasive dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the abrasive dispersion can be varied based on skill in the art. Typically, the introduction of a modifying additive or precursor of a modifying additive will cause the abrasive dispersion to gel. The abrasive dispersion can also be induced to gel by application of heat over a period of time.

The abrasive dispersion can also contain a nucleating agent to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such abrasive dispersions is disclosed in U.S. Pat. No. 4,744,802 to Schwabel.

A peptizing agent can be added to the abrasive dispersion to produce a more stable hydrosol or colloidal abrasive dispersion. Suitable peptizing agents are monoprotic acids or acid compounds such as acetic acid, hydrochloric acid, formic acid, and nitric acid. Multiprotic acids can also be used but they can rapidly gel the abrasive dispersion, making it difficult to handle or to introduce additional components thereto. Some commercial sources of boehmite contain an acid titer (such as absorbed formic or nitric acid) that will assist in forming a stable abrasive dispersion.

The abrasive dispersion can be formed by any suitable means, such as, for example, simply by mixing aluminum oxide monohydrate with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as wetting agents, alcohols, or coupling agents can be added if desired. The alpha alumina abrasive grain may contain silica and iron oxide as disclosed in U.S. Pat. No. 5,645,619 to Erickson et al. on Jul. 8, 1997. The alpha alumina abrasive grain may contain zirconia as disclosed in U.S. Pat. No. 5,551,963 to Larmie on Sep. 3, 1996. Alternatively, the alpha alumina abrasive grain can have a microstructure or additives as disclosed in U.S. Pat. No. 6,277,161 to Castro on Aug. 21, 2001.

The second process step involves providing a mold having at least one mold cavity, and preferably a plurality of cavities. The mold can have a generally planar bottom surface and a plurality of mold cavities. The plurality of cavities can be formed in a production tool. The production tool can be a belt, a sheet, a continuous web, a coating roll such as a rotogravure roll, a sleeve mounted on a coating roll, or die. The production tool comprises polymeric material. Examples of suitable polymeric materials include thermoplastic materials such as polyesters, polycarbonates, poly(ether sulfone), poly(methyl methacrylate), polyurethanes, polyvinylchloride, polyolefins, polystyrene, polypropylene, polyethylene or combinations thereof, or thermosetting materials. In one embodiment, the entire tooling is made from a polymeric or thermoplastic material. In another embodiment, the surfaces of the tooling in contact with the sol-gel while drying, such as the surfaces of the plurality of cavities (mold bottom surface and mold sidewall) comprises polymeric or thermoplastic materials and other portions of the tooling can be made from other materials. A suitable polymeric coating may be applied to a metal tooling to change its surface tension properties by way of example.

A polymeric or thermoplastic tool can be replicated off a metal master tool. The master tool will have the inverse pattern desired for the production tool. The master tool can be made in the same manner as the production tool. In one embodiment, the master tool is made out of metal, e.g., nickel and is diamond turned. A polymeric or thermoplastic sheet material can be heated along with the master tool such that the polymeric or thermoplastic material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. Nos. 5,152,917 (Pieper et al.); 5,435,816 (Spurgeon et al.); 5,672,097 (Hoopman et al.); 5,946,991 (Hoopman et al.); 5,975,987 (Hoopman et al.); and 6,129,540 (Hoopman et al.).

Access to cavities can be from an opening in the top surface or bottom surface of the mold. In some instances, the cavity can extend for the entire thickness of mold. Alternatively, the cavity can extend only for a portion of the thickness of the mold. In one embodiment, the top surface is substantially parallel to bottom surface of the mold with the cavities having a substantially uniform depth. At least one side of the mold, i.e. the side in which the cavity is formed, can remain exposed to the surrounding atmosphere during the step in which the volatile component is removed.

The cavity has a predetermined three-dimensional shape. In one embodiment, the shape of a cavity can be described as being a triangle, as viewed from the top, having a sloping sidewall such that the bottom surface of the cavity is slightly smaller than the opening in the top surface. A sloping sidewall is believed to enable easier removal of the shaped precursor abrasive particles from the mold and to enhance the grinding performance of the abrasive particles. In various embodiments of the invention, the draft angle α can be between about 95 degrees to about 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees. In another embodiment, the mold comprised a plurality of triangular cavities. Each of the plurality of triangular cavities comprises an equilateral triangle.

Alternatively, other cavity shapes can be used, such as, circles, rectangles, squares, hexagons, stars, or combinations thereof, all having a substantially uniform depth dimension. The depth dimension is equal to the perpendicular distance from the top surface to the lowermost point on the bottom surface. In addition, a cavity can have the inverse of other geometric shapes, such as, for example, pyramidal, frusto-pyramidal, truncated spherical, truncated spheroidal, conical, and frusto-conical. The depth of a given cavity can be uniform or can vary along its length and/or width. The cavities of a given mold can be of the same shape or of different shapes.

The mold cavities can contain an upstanding molded element that rises from the cavities' bottom a sufficient distance to produce an opening through the precursor shaped abrasive particle during the molding step. As such, the mold cavities can be similar to a "Bundt" cake pan used to make a "Bundt" cake. The upstanding mold element can be replicated into the cavities using processes as described above to make the polymeric production tooling.

The third process step involves filling the cavities in the mold with the abrasive dispersion by any conventional technique. In some embodiments, a knife roll coater or vacuum slot die coater can be used. A mold release can be used to aid in removing the particles from the mold if desired. Typical mold release agents include oils such as peanut oil or mineral oil, fish oil, silicones, polytetrafluoroethylene, zinc sterate, and graphite. In general, between about 0.1% to about 5% by weight mold release agent, such as peanut oil, in a liquid, such as water or alcohol, is applied to the surfaces of the production tooling in contact with the sol-gel such that between about 0.1 mg/in$^2$ to about 3.0 mg/in$^2$, or between about 0.1 mg/in$^2$ to about 5.0 mg/in$^2$ of the mold release agent is present per unit area of the mold when a mold release is desired. In one embodiment, the top surface of the mold is coated with the abrasive dispersion. The abrasive dispersion can be pumped onto top surface. Next, a scraper or leveler bar can be used to force the abrasive dispersion fully into the cavity of the mold. The remaining portion of the abrasive dispersion that does not enter cavity can be removed from top surface of the mold and recycled. In some embodiments, a small portion of the abrasive dispersion can remain on top surface and in other embodiments the top surface is substantially free of the dispersion. The pressure applied by the scraper or leveler bar is typically less than 100 psi, or less than 50 psi, or less than 10 psi. In some embodiments, no exposed surface of the abrasive dispersion extends substantially beyond the top surface to ensure uniformity in thickness of the resulting shaped abrasive particles 20.

The fourth process step involves removing the volatile component to dry the dispersion thereby creating the openings 22 in the shaped abrasive particles 20. Desirably, the volatile component is removed by fast evaporation rates. A sufficient amount of the volatile component must be rapidly removed from the abrasive dispersion to bring rapid solidification thereof, thereby forming a large meniscus that leads to formation of an opening 22.

In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic.

In one embodiment, for a water dispersion of between about 40 to 50 percent solids and a polypropylene mold, the drying temperatures can be from about 90 degrees C. to about 165 degrees C., or between about 105 degrees C. to about 150 degrees C., or between about 105 degrees C. to about 120 degrees C. Higher temperatures can lead to the formation of larger openings but can also lead to degradation of the polypropylene tooling limiting its useful life as a mold.

In one embodiment, a sol was prepared by combining 600 parts deionized water, 24 parts nitric acid 400, 400 parts boehmite alumina (DISPERAL, Sasol North America Inc., Houston Tex.), 45.6 parts silica sol (Nycol 215 from Eka Nobel, Inc. of Augusta Ga.), and 76.2 parts of a 9% solution of iron oxide (as $Fe_2O_3$) in water, followed by mixing in a high-speed mixer for two minutes. The mixture was allowed to stand for one hour to form a sol-gel.

Figure 7:
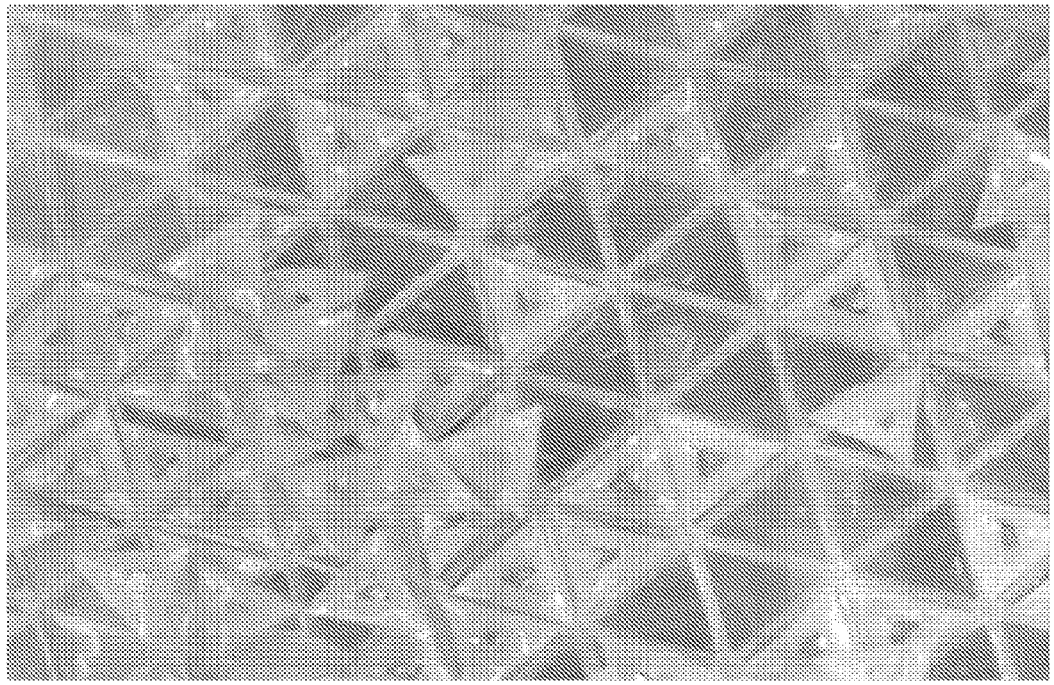
FIG. 7 illustrates a photomicrograph of another embodiment of shaped abrasive particles with an opening in a production tooling having a plurality of mold cavities.

The sol-gel was coated into a polymeric tool with openings in the shape of equilateral triangles approximately 90 mils (2.286 mm) on each side and 30 mils (0.762 mm) thick, by forcing the sol-gel into the openings with a putty knife. The coated tool was attached to a tenter frame and placed into an oven (LABDRYER LTE, Warner Mathis USA, Inc., Concord, N.C.) set at 145 degrees Celsius and the fan set at 2000 RPM to blow air on the surface of the coating, until the surface temperature of the coating reached 21 degrees Celsius. The resulting precursor shaped abrasive particles uniformly had central openings 22 in them as shown in FIG. 7. These precursor shaped abrasive particles can be fired to produce shaped abrasive particles 20 with an opening 22.

The fifth process step involves removing the precursor shaped abrasive particles with an opening from the mold cavities. The precursor shaped abrasive particles with an opening can be removed from the cavities by using the following processes alone or in combination on the mold: gravity, vibration, ultrasonic vibration, vacuum, or pressurized air to remove the particles from the mold cavities.

The precursor shaped abrasive particles with an opening can be further dried outside of the mold. If the abrasive dispersion is dried to the desired level in the mold, this additional drying step is not necessary. However, in some instances it may be economical to employ this additional drying step to minimize the time that the abrasive dispersion resides in the mold. Typically, the shaped precursor abrasive particles will be dried between 10 to 480 minutes, or between 120 to 400 minutes, at a temperature from 50 degrees C. to 160 degrees C., or at 120 degrees C. to 150 degrees C.

The sixth process step involves calcining the shaped precursor abrasive particles with an opening. During calcining, essentially all the volatile material is removed, and the various components that were present in the abrasive dispersion are transformed into metal oxides. The precursor shaped abrasive particles are generally heated to a temperature of from 400 degrees C. to 800 degrees C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, shaped precursor abrasive particles. Then the precursor shaped abrasive particles are prefired again. This option is further described in European Patent Application No. 293,163.

The seventh process step involves sintering the calcined, precursor shaped abrasive particles to form alpha alumina particles. Prior to sintering, the calcined, precursor shaped abrasive particles are not completely densified and thus lack the desired hardness to be used as abrasive particles. Sintering takes place by heating the calcined, precursor shaped abrasive particles to a temperature of from 1,000 degrees C. to 1,650 degrees C. and maintaining them within this temperature range until substantially all of the alpha alumina monohydrate (or equivalent) is converted to alpha alumina and the porosity is reduced to less than 15 percent by volume. The length of time to which the calcined, precursor shaped abrasive particles must be exposed to the sintering temperature to achieve this level of conversion depends upon various factors but usually from five seconds to 48 hours is typical. In another embodiment, the duration for the sintering step ranges from one minute to 90 minutes. After sintering, the shaped abrasive particles can have a Vickers hardness of 10 GPa, 16 GPa, 18 GPa, 20 GPa, or greater.

Other steps can be used to modify the described process, such as rapidly heating the material from the calcining temperature to the sintering temperature, centrifuging the abrasive dispersion to remove sludge, waste, etc. Moreover, the process can be modified by combining two or more of the process steps if desired. Conventional process steps that can be used to modify the process of this disclosure are more fully described in U.S. Pat. No. 4,314,827 to Leitheiser. More information on making shaped abrasive particles with openings is described in copending application U.S. Ser. No. 12/337,001 entitled "Method of Making Abrasive Shards, Shaped Abrasive Particles With An Opening, Or Dish-Shaped Abrasive Particles", and filed on Dec. 17, 2008. Additionally, the shaped abrasive particles with an opening can have grooves on one of the faces as described in copending application U.S. Ser. No. 12/627,567 entitled "Shaped Abrasive Particles With Grooves", and filed on Dec. 17, 2008. The grooves are formed by a plurality of ridges in the bottom surface of the mold cavity that have been found to make it easier to remove the precursor shaped abrasive particles from the mold.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

Preparation of REO-Doped Shaped Abrasive Particles 20

A sample of boehmite sol-gel was made using the following recipe: aluminum oxide monohydrate powder (4824 parts) having the trade designation "DISPERAL" was dispersed by high shear mixing a solution containing water (7087 parts) and 70% aqueous nitric acid (212 parts) for 13 minutes. The resulting sol-gel was aged for 1 hour before coating. The sol-gel was forced into production tooling having triangular shaped mold cavities of 28 mils depth and 110 mils on each side. The draft angle α between the sidewall and bottom of the mold was 98 degrees. The production tooling was manufactured to have 50% of the mold cavities with 8 parallel ridges rising from the bottom surfaces of the cavities that intersected with one side of the triangle at a 90 degree angle and the remaining cavities had a smooth bottom mold surface. The parallel ridges were spaced every 0.277 mm and the cross section of the ridges was a triangle shape having a height of 0.0127 mm and a 45 degree angle between the sides of each ridge at the tip as described in patent application Ser. No. 12/627,567 referred to above. The sol-gel was forced into the cavities with a vacuum slot die coating station so that all the openings of the production tooling were completely filled. A mold release agent, 2% peanut oil in water, was used on the production tooling with about 1 mg/in$^2$ of peanut oil applied to the production tooling. The sol-gel coated production tooling was passed through a 27 foot convection air oven at 10 feet per minute set to 135 degrees Celsius at 60% air velocity in the 13.5 foot zone 1 section and 121 degrees Celsius at 40% air velocity in the 13.5 foot zone 2 section. The precursor shaped abrasive particles were removed from the production tooling by passing it over an ultrasonic horn. The precursor shaped abrasive particles were calcined at approximately 650 degrees Celsius and then saturated with a mixed nitrate solution of the following concentration (reported as oxides): 1.8% each of MgO, $Y_2O_3$, $Nd_2O_3$ and $La_2O_3$. The excess nitrate solution was removed and the saturated precursor shaped abrasive particles with openings were allowed to dry after which the particles were again calcined at 650 degrees Celsius and sintered at approximately 1400 degrees Celsius. Both the calcining and sintering was performed using rotary tube kilns.

Preparation of REO-Doped Shaped Abrasive Particles 20 with Openings

The above procedure was followed except that the production tooling was not re-treated with peanut oil mold release on the second use. The reduction of peanut oil present in the mold cavities was believed to be the condition for making an opening 22 within each individual triangular particle.

The resulting triangular-shaped abrasives each had an opening 22 near the center. FIG. 3 shows the shaped abrasive particles 20 from the two preparation procedures.

The two samples of the shaped abrasive particles 20 with an opening 22 described above were graded to sizes −18+20 mesh (USA Standard Testing Sieves) to remove any shards or broken shapes and subsequently coated onto fiber disc backings using a calcium carbonate filled make coating, cryolite filled size coating and potassium fluoroborate ($KBF_4$) filled supersize coating. A total of four lots were prepared:
  1. Triangles with openings, 18 grams of mineral per disc
  2. Triangles with openings, 9 grams of mineral per disc
  3. Triangles without openings, 18 grams mineral per disc
  4. 321 CUBITRON grain (random crushed) −18+20 mesh, 18 grams mineral per disc The grinding performance of the discs was evaluated using a slide action grinding test on a 304 stainless steel workpiece using either 12 lbs force or 18 lbs force of load between the abrasive and the workpiece. The Slide Action Test was designed to measure the cut rate of the coated abrasive disc. Each abrasive disc was used to grind the face of a 1.25 cm by 18 cm 304 stainless steel workpiece. The grinder used was a constant load disc grinder. The constant load between the workpiece and the abrasive disc was provided by a load spring. The back-up pad for the grinder was an aluminum back-up pad, beveled at approximately 7 degrees, extending from the edge and in towards the center 3.5 cm. The disc was secured to the aluminum pad by a retaining nut and was driven at 5,000 rpm. The amount of metal in grams removed at one-minute intervals was recorded. The workpiece load on the disc was about 5.4 kg (12 lbs) (FIG. 8) or 8.2 kg (18 lbs) (FIG. 9).

Figure 8:
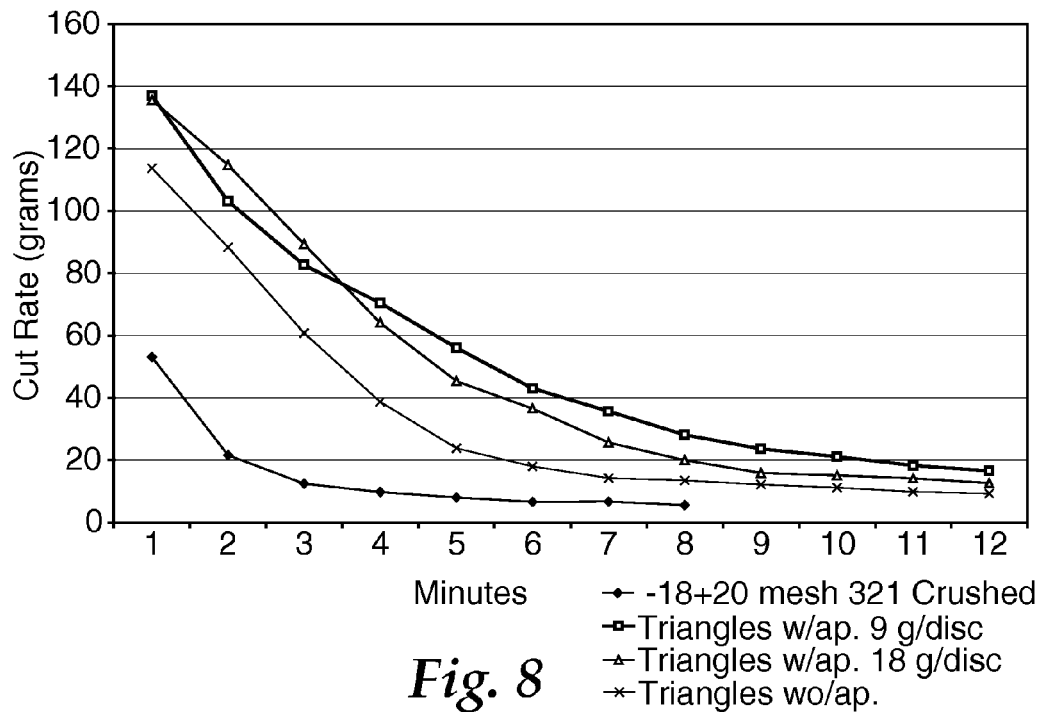
FIG. 8 illustrates a graph of grinding performance.
Figure 9:
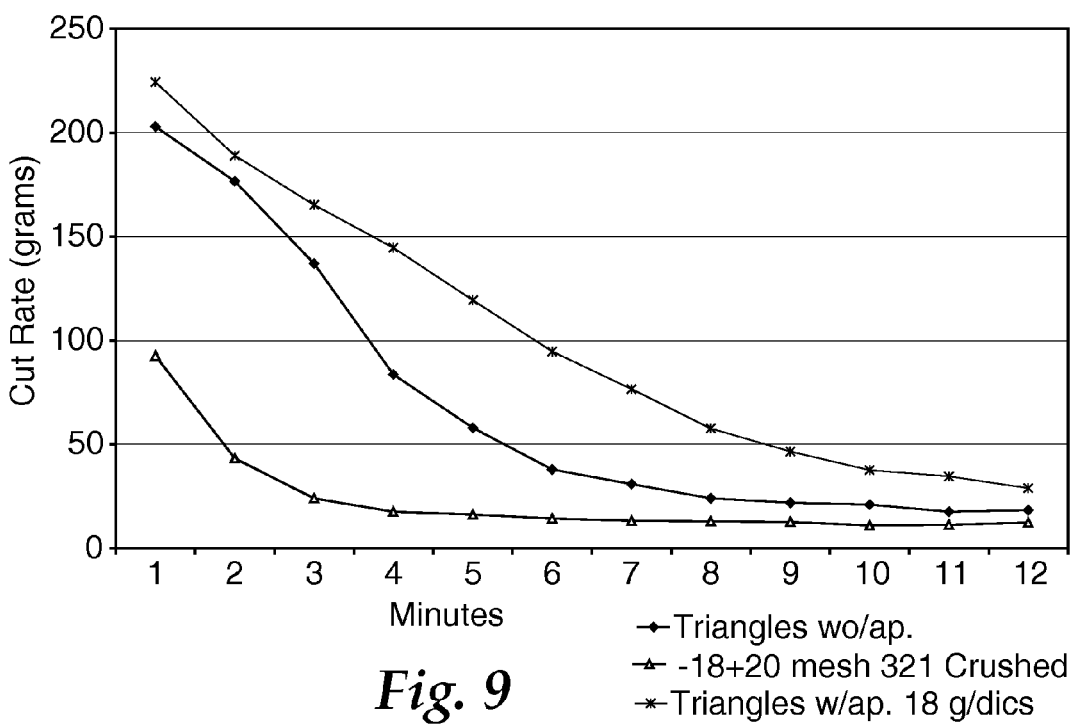
FIG. 9 illustrates another graph of grinding performance.

Referring to FIGS. 8 and 9, the triangular shaped abrasive particles 20 with an opening 22 performed significantly better than the solid, triangular shaped abrasive particles or the random crushed grain. In particular, a disc having only 9 grams of shaped abrasive particles 20 with an opening 22 performed better than a disc having 18 g of abrasives having the same shape but without the openings.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. Abrasive particles comprising: shaped abrasive particles having a shape that is replicated from a mold cavity, the shaped abrasive particles each having an opening, each of the shaped abrasive particles comprising alpha alumina and having a first face and a second face separated by a thickness t.

2. The abrasive particles of claim 1 wherein a perimeter of the first face and the second face comprises a triangular shape.

3. The abrasive particles of claim 2 wherein the opening comprises a substantially triangular shape.

4. The abrasive particles of claim 1 wherein the opening passes through the first face and the second face.

5. The abrasive particles of claim 4 comprising an opening ratio of an opening area divided by an area of the larger of either the first face or the second face and wherein the opening ratio is between 0.05 to about 0.95.

6. The abrasive particles of claim 5 wherein the opening ratio is between 0.1 to about 0.5.

7. The abrasive particles of claim 6 wherein a perimeter of the first face and the second face comprises a triangular shape.

8. The abrasive particles of claim 7 wherein the opening comprises a substantially triangular shape.

9. The abrasive particles of claim 1 wherein a bulk density of the shaped abrasive particles is less than 1.35 g/cm$^3$.

10. The abrasive particles of claim 9 wherein the bulk density of the shaped abrasive particles is less than 1.00 g/cm$^3$.

11. The abrasive particles of claim 1 comprising a sidewall connecting the first face and the second face, and a draft angle $\alpha$ between the second face and the sidewall, and the draft angle $\alpha$ is greater than 90 degrees.

12. The abrasive particles of claim 11 wherein the draft angle $\alpha$ is between about 95 degrees to about 130 degrees.

13. The abrasive particles of claim 1 wherein the opening comprises an inner surface and the inner surface is curved such that a size of the opening in the first face is larger than the size of the opening in the second face.

14. The abrasive particles of claim 1 wherein the opening comprises an inner surface and the inner surface is tapered.

15. The abrasive particles of claim 1 wherein the shaped abrasive particles comprise an integral connection of a plurality of bars joined at their respective ends to form a closed polygon.

16. The abrasive particles of claim 15 wherein a perimeter of the first face and the second face comprises a triangular shape.

17. The abrasive particles of claim 16 wherein the opening comprises a substantially triangular shape.

18. The abrasive particles of claim 15 wherein a bulk density of the shaped abrasive particles is less than 1.35 g/cm$^3$.

19. The abrasive particles of claim 18 wherein the bulk density of the shaped abrasive particles is less than 1.00 g/cm$^3$.

20. The abrasive particles of claim 15 comprising a sidewall connecting the first face and the second face, and a draft angle $\alpha$ between the second face and the sidewall, and the draft angle $\alpha$ is greater than 90 degrees.

21. The abrasive particles of claim 20 wherein the draft angle $\alpha$ is between about 95 degrees to about 130 degrees.

22. The abrasive particles of claim 1 comprising a binder forming an abrasive article selected from the group consisting of bonded abrasive articles, coated abrasive articles, nonwoven abrasive articles, and abrasive brushes.

23. The abrasive particles of claim 1 comprising a make coat on a major surface of a backing and the shaped abrasive particles adhered to the make coat forming an abrasive layer, the abrasive layer coated with a size coat, and wherein the abrasive layer comprises at least 5 percent by weight of the shaped abrasive particles.

24. The abrasive particles of claim 23 comprising a grinding aid in the opening of at least some of the shaped abrasive particles.

25. The abrasive particles of claim 23 comprising the make coat or the size coat in the opening of at least some of the shaped abrasive particles.

26. A method of making the abrasive particles of claim 1 comprising:
   providing a mold having a plurality of cavities, the plurality of cavities comprising polymeric surfaces;
   filling the plurality of cavities with a sol-gel, the sol-gel comprising particles that can be converted into alpha alumina in a liquid, the liquid comprising a volatile component;
   removing at least a portion of the volatile component from the sol-gel while the sol-gel resides in the plurality of cavities thereby forming a plurality of precursor shaped abrasive particles each having an opening; and
   sintering the plurality of precursor shaped abrasive particles.

27. The method of claim 26 wherein the plurality of cavities comprise an upstanding mold element that rises from a bottom of the cavity for producing the opening.

28. Abrasive particles comprising: shaped abrasive particles having a shape that is replicated from a mold cavity, the shaped abrasive particles each having a single opening, each of the shaped abrasive particles comprising alpha alumina and having a first face and a second face separated by a thickness t and wherein the single opening passes through the first face and the second face.

29. The abrasive particles of claim 28 comprising an opening ratio of an opening area divided by an area of the larger of either the first face or the second face and wherein the opening ratio is between about 0.05 to about 0.3.

30. The abrasive particles of claim 28 wherein a bulk density of the shaped abrasive particles is less than 1.20 g/cm$^3$.

31. The abrasive particles of claim 28 comprising a sidewall connecting the first face and the second face, and a draft angle $\alpha$ between the second face and the sidewall, and the draft angle $\alpha$ is greater than 90 degrees.

32. The abrasive particles of claim 28 wherein the shaped abrasive particles comprise an integral connection of a plurality of bars joined at their respective ends to form a closed polygon.

33. The abrasive particles of claim 28 wherein the single opening is selected to have a shape that is different from a shape of a perimeter of the shaped abrasive particles.

34. The abrasive particles of claim 28 wherein a perimeter of the first face and the second face comprises a triangular shape.

\* \* \* \* \*

UNITED STATES PATENT AND TRADEMARK OFFICE
CERTIFICATE OF CORRECTION

PATENT NO. : 8,142,532 B2  
APPLICATION NO. : 12/337112  
DATED : March 27, 2012  
INVENTOR(S) : Dwight D Erickson Page 1 of 1

It is certified that error appears in the above-identified patent and that said Letters Patent is hereby corrected as shown below:

Column 7
Line 58, delete "0.25 A," and insert -- 0.25A, --, therefor.

Column 9
Line 29, delete "erodable" and insert -- erodible --, therefor.

Column 10
Line 39, delete "tetrachloronaphtalene," and insert -- tetrachloronaphthalene, --, therefor.
Line 42, delete "tetrafluoroboate," and insert -- tetrafluoroborate, --, therefor.

Column 13
Line 51, delete "sterate," and insert -- stearate, --, therefor.

Signed and Sealed this
Twenty-ninth Day of May, 2012

David J. Kappos
*Director of the United States Patent and Trademark Office*